United States Patent [19]
Olin

[11] 3,907,544
[45] Sept. 23, 1975

[54] HERBICIDAL 2-HALO-N-(CYCLICIMIDOALKYLENE)-SUBSTITUTED ACETANILIDES

[75] Inventor: John F. Olin, Ballwin, Mo.
[73] Assignee: Monsanto Company, St. Louis, Mo.
[22] Filed: Sept. 24, 1973
[21] Appl. No.: 400,272

Related U.S. Application Data
[62] Division of Ser. No. 148,892, June 1, 1971, Pat. No. 3,769,301.

[52] U.S. Cl. ............................ 71/95; 71/92; 71/93; 71/94; 71/98; 71/118
[51] Int. Cl................................................. A01n 9/22
[58] Field of Search .......................... 71/118, 95, 98

[56] References Cited
UNITED STATES PATENTS
| | | | |
|---|---|---|---|
| 3,637,847 | 1/1972 | Olin | 71/118 |
| 3,780,090 | 12/1973 | Akiba | 71/115 |

*Primary Examiner*—James O. Thomas, Jr.
*Attorney, Agent, or Firm*—William I. Andress

[57] ABSTRACT

Herbicidal N-(acyl-tertiary-amidoalkyl)-2-halo-substituted acetanilides.

22 Claims, No Drawings

HERBICIDAL 2-HALO-N-(CYCLICIMIDOALKYLENE)-SUBSTITUTED ACETANILIDES

This is a division of application Ser. No. 148,892, filed June 1, 1971 now U.S. Pat. No. 3,769,301.

This invention relates to novel N-(acyl-tertiary-amidoalkyl)acetanilides which are useful as herbicides and to methods of preparing them. More particularly, the invention relates to herbicidally active N-(acyl-substituted amidoalkyl)acetanilides and N-acylimidoalkyl acetanilides. The invention also relates to herbicidal compounds and to methods of inhibiting or preventing the growth of plants.

The term "plants" is used herein to include germinant seeds, emerging seedlings and established vegetation, including the roots and above-ground portions.

The novel compounds of the present invention are represented by the formula

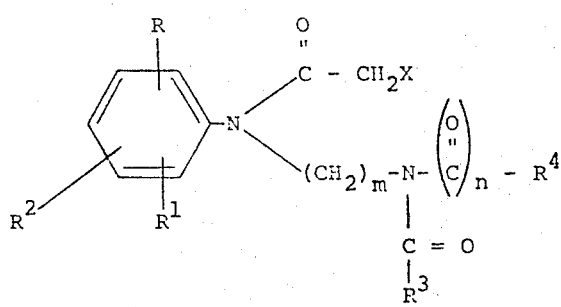

wherein:
R and $R^1$ are hydrogen, alkyl or alkoxy having at least 1 and not more than 10 carbon atoms and can be like or unlike,
$R^2$ is hydrogen, alkyl or alkoxy having at least 1 and not more than 10 carbon atoms, $NO_2$ or halogen,
$R^3$ is hydrogen, alkyl, alkenyl, alkynyl, alkoxy, alkythio, polyalkoxy, polyalkylthio, alkoxyalkyl, alkylthioalkyl, polyalkoxyalkyl, polyalkylthioalkyl, haloalkyl, hydroxyalkyl, mercaptoalkyl, haloalkenyl, oxoalkyl, alkenyloxyalkyl, alkenylthioalkyl, each of a maximum of 18 carbon atoms; cycloalkyl having at least 3 and a maximum of 6 carbon atoms; aryl, aryloxyalkyl, arylthioalkyl, trifluoromethyl- and haloaryl, trifluoromethyl- and haloaryloxyalkyl, trifluoromethyl- and haloarylthioalkyl, arylalkyl, nitroaryl, nitroarylthioalkyl, and nitroarylalkyl having at least 6 and not more than 24 carbon atoms; amino or mono- and dialkylamino, monoarylamino, mono(haloaryl)amino, mono(trifluoromethylaryl)amino, and alkylalkoxyamino having a maximum of 10 carbon atoms,
$R^4$ is alkyl, alkenyl, aryl or alkaryl having a maximum of 18 carbon atoms, or $R^3$ and $R^4$ are combined to form an alkylene or alkenylene bridge having at least 2 and not more than 5 carbon atoms, or a phenylene group,
X is chlorine, bromine or iodine,
m is an integer of 1 or 2, and n is an integer of 0 to 2 inclusive.

Unless otherwise indicated, "alkyl" and "alkoxy" are used generically to include primary, secondary, and tertiary groups.

Representative compounds of the present invention include those in which the groups of the above formula have the following identities:

R and $R^1$ — hydrogen, methyl, ethyl, propyl, isopropyl, n-butyl, primary isobutyl, secondary isobutyl, tertiary butyl, n-amyl, branch chain amyls, the normal and branched hexyls, heptyls, octyls, nonyls, and decyls, methoxy, ethoxy, propoxy, butoxy, pentyloxy, heptyloxy, nonyloxy;

$R^2$ — hydrogen, chlorine, bromine, fluorine, iodine, nitro and the alkyl and alkoxy groups of R and $R^1$;

$R^3$ — hydrogen, methyl, ethyl, propyl, isopropyl, n-butyl, isobutyl, tertiary butyl, the normal and branched amyls, hexyls, heptyls, octyls, nonyls, decyls, dodecyls, tetradecyls, hexadecyls and octadecyls; chloromethyl, bromopropyl, iodobutyl, fluorohexyl, hydroxyethyl, dihydroxypropyl; the alkoxy, alkenyl, oxoalkyl, alkoxyalkyl and alkynyl groups corresponding to the above-enumerated alkyl groups; phenyl, tolyl, naphthyl, phenoxy, benzyl, phenoxyalkyl; halophenoxyalkyls; ethylene, trimethylene, tetramethylene; and the like.

$R^4$ — the alkyl, alkenyl, alkynyl, aryl and alkaryl groups of $R^3$.

When $R^3$ and $R^4$ are combined as a polymethylene bridge between the nitrogen atom and the carbonyl carbon atom and n is 0, lactamyl radicals are formed. These include 2-pyrrolidinon-1-yl or (2-oxotetramethylene imino), 2-piperidinon-1-yl or (2-oxopentamethylene imino) and 2-oxo-hexamethylene imino. When n is 1, $R^3$ and $R^4$ can combine to form cyclic imides including phthalimides.

The preferred compounds of the present invention are those in which both R and $R^1$ are ethyl and more particularly the compounds in which they are in the ortho positions.

The novel compounds of the present invention in which m is 1 are prepared by the reaction of a substituted methylenearylamine of the type disclosed and claimed in copending application Ser. No. 625,020 filed Mar. 22, 1967, with an appropriately substituted amide or imide to form the corresponding N-(anilinomethyl) amide or imide. The intermediate amide or imide is then haloacetylated with a haloacetylhalide to provide the compounds under consideration.

The novel compounds in which m is 2 are readily prepared by the haloacetylation of an N-(substituted phenyl)-N'-acyl-N'-hydrocarbyl-ethylenediamine. The ethylenediamine derivatives used as starting materials for such reactions can be readily prepared in conventional manners by the alkylation of a substituted aniline with an alkylating agent such as an N-(2-chloroethyl)-alkylamide, an N-2-(hydroxyethyl)-alkylamide or an N-acyl aziridine.

The invention will be more clearly understood by reference to the following detailed description of specific examples thereof. In these examples and throughout the specification, all proportions are expressed in part by weight unless otherwise indicated.

EXAMPLE 1

N-(2,6-Diethylanilinomethyl)-N-methylacetamide

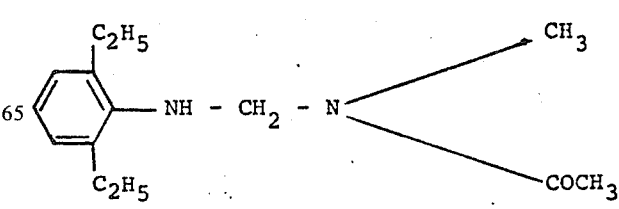

About 100 parts of N-methylacetamide were charged into a suitable reaction vessel and about 100 parts of 2% sodium methoxide suspension in dimethylformamide were added. The reaction was exothermic and the temperature of the reaction mixture rose from about 24°C to about 30°C. Then about 160 parts of 2,6-diethyl-N-methyleneaniline were added resulting in an additional rise in temperature to about 44°C. The reaction mixture was maintained at this temperature with continued agitation for about 7 hours. With continued stirring it was permitted to return to room temperature over a period of about 16 hours. About 3 parts of acetic acid were added, then about 200 parts water and the mixture vigorously agitated. About 150 parts of benzene were added to aid in the separation of the mixture into an oil layer and a water layer. The water layer was discarded and the oil layer washed with an additional 200 parts water containing one part acetic acid, dried over magnesium sulfate and vacuum distilled. A straw colored liquid identified as N-2,6-diethylanilinomethyl-N-methyl acetamide was obtained.

| | |
|---|---|
| Calc'd for $C_{14}H_{22}N_2O$: | C, 71.75 H, 9.46 N, 11.95 |
| Found: | C, 71.90 H, 9.54 N, 12.05 |

EXAMPLE 2

2-chloro-N-(N-methylacetamidomethyl)-2',6'-diethylacetanilide

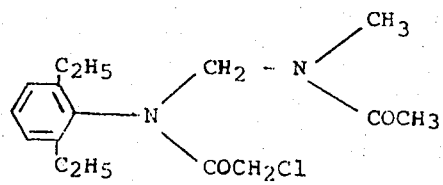

About 72 parts of N-(2,6-dimethylanilinomethyl)-N-methylacetamide obtained in accordance with the procedure of Example 1 were dissolved in about 100 grams of toluene and introduced into a suitable reaction vessel to which about 40 parts of 2,6-lutidine were added. The mixture was chilled with carbon dioxide-acetone and while being vigorously agitated about 40 parts of chloroacetyl chloride in 70 parts of benzene were added over a 15 minute period with the temperature of the reaction mixture being maintained between −20°C and −30°C. With continued agitation, the reaction mixture was permitted to warm to room temperature. About 100 parts of water were then added and the mixture separated into an oily fraction and an aqueous fraction. The aqueous fraction was discarded and the oily fraction washed twice with 150 parts of water at a temperature of about 35°C. The reaction mixture was then vacuum evaporated to substantial dryness and about 100 parts methylcyclohexane added to the residue followed by the addition of about 15 parts benzene to provide a homogeneous solution. The product crystallized from the solution upon standing and was removed from the liquid phase by filtration. The precipitate was washed with a mixture of methylcyclohexane and benzene and then air dried. After recrystallization from a benzenehexane mixture, a cream colored product was obtained.

| | |
|---|---|
| Calc'd for $C_{16}H_{23}ClN_2O_2$: | C, 61.83 H, 7.46 Cl, 11.41 N, 9.01 |
| Found: | C, 61.68 H, 7.47 Cl, 11.48 N, 8.97 |

EXAMPLE 3

2-chloro-2',6'-diethyl-N-(succinimidomethyl)acetanilide

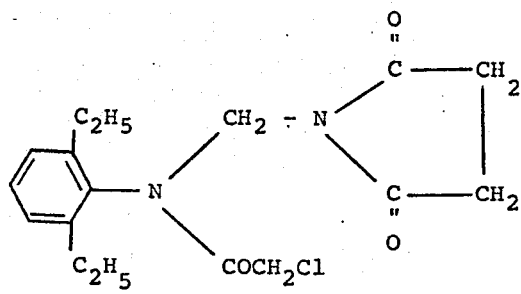

A mixture of about 30 parts of 2,6-diethyl-N-methyleneaniline, 20 parts of succinimide and 75 parts of dimethyl formamide were heated at a temperature of about 90°–95°C for 18 hours in a suitable reaction vessel. The reaction mixture was then vacuum evaporated to provide a residue containing N-(2,6-diethylanilinomethyl)-succinimide. The residue was dissolved in about 150 parts of toluene and about 30 parts 2,6-lutidine were added. The mixture was cooled to about −10°C and about 23 parts of chloroacetyl chloride were added incrementally over a period of 20 minutes while maintaining the temperature of the reaction mixture between about −10°C and 5°C. This resulted in the formation of a heavy precipitate. The reaction mixture was then cooled to about 0°C and maintained at that temperature for about one hour, at the end of which time the precipitate was removed from the dark mother liquor. The precipitate was washed with dilute hydrochloric acid, water and then with toluene. The precipitate was then recrystallized from a methylcyclohexane-ethyl acetate mixture to obtain a gray powder having a melting point of 146°–147°C.

| | |
|---|---|
| Calc'd for $C_{17}H_{21}ClN_2O_3$: | C, 60.62 H, 6.28 Cl, 10.53 N, 8.32 |
| Found: | C, 60.90 H, 6.25 Cl, 10.53 N, 8.25 |

EXAMPLE 4

2-chloro-2',6'-diethyl-N-[(2-pyrrolidinon-1-yl)methyl]acetanilide

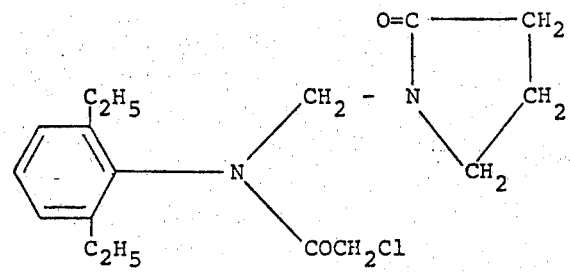

About 40 parts of N-(2,6-diethylanilinomethyl)-2-pyrrolidinone were dissolved in about 100 parts toluene and about 30 parts 2,6-lutidine were added to the solution contained in a suitable reaction vessel. The mixture was then cooled to about −30°C with continuous agitation. About 23 parts of chloroacetyl chloride dissolved in about 80 parts toluene were added over a 15 minute period while maintaining the temperature of the mixture between −20° and −30°C. After the addition was complete, the reaction mixture was permitted to warm to room temperature and about 100 parts of water were added. This resulted in the formation of an oily fraction and an aqueous fraction. The aqueous fraction was discarded and the remaining oil washed with water and vacuum stripped. The oily residue was dissolved in a mixture of 100 parts of methylcyclohexane and 20 parts benzene. The product precipitated from this mixture on standing and upon recrystallization from a mixture of methylcyclohexane and benzene was obtained in the form of colorless granules having a melting point of 56°–57°C.

| Calc'd for $C_{17}H_{23}ClN_2O_2$: | C, 63.25 H, 7.18 Cl, 10.98 |
|---|---|
| Found: | C, 63.36 H, 7.33 Cl, 11.02 |

EXAMPLE 5

N-(2,6-diethylanilinomethyl)-N,N′,N′-trimethyloxamide

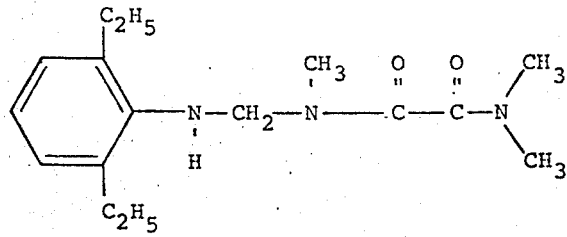

About 650 parts of N,N′,N′-trimethyloxamide and about 4 parts of potassium hydroxide pellets were introduced into a suitable reaction vessel and about 800 parts of 2,6-diethylphenylazomethine were added, followed by the addition of about 5 parts of a 25% solution of sodium methoxide in methanol. The reaction started slowly and the temperature rose from room temperature to about 50°C. in 15 minutes, followed by a drop in temperature to about 45°C. The mixture was subsequently heated to about 100°C. with continued stirring and allowed to cool to room temperature (about 23°C.). The resulting honey-like syrup which contained some unreacted pellets of sodium hydroxide was dissolved in 2,500 parts of methylcyclohexane and acidified with about 10 parts of acetic acid. Upon stirring the reaction mixture, the product crystallized to form colorless granules which were filtered and washed twice with 1,200 parts of methylcyclohexane. The product was finally washed 3 times with 1,500 parts of water and air dried. The product thus obtained had a melting point of 73°–73.3°C.

| Calc'd for $C_{16}H_{25}N_3O_2$: | C, 65.9 H, 8.6 N, 14.4 |
|---|---|
| Found: | C, 65.9 H, 8.6 N, 14.4 |

This compound and related compounds having 2 adjacent carbonyl groups can be readily haloacetylated to form compounds of the present invention in which $n$ is 2.

EXAMPLES 6 THROUGH 41

The following compounds are also prepared by substantial repetition of the general procedures set forth in the foregoing Examples.

6. 2-chloro-2′,6′-dimethyl-N-(succinimidomethyl)acetanilide
7. 2-chloro-2′,6′-dimethyl-N-(succinimidoethyl)acetanilide
8. 2-bromo-2′-ethyl-6′-methyl-N-(succinimidoethyl)acetanilide
9. 2-iodo-2′,6′-diethyl-N-(succinimidomethyl)acetanilide
10. 2-bromo-2′,6′-diethyl-N-(succinimidomethyl)acetanilide
11. 2-chloro-2′,6′-diethyl-N-(maleimidomethyl)acetanilide
12. 2-chloro-2′,6′-dimethyl-N-(maleimidomethyl)acetanilide
13. 2-chloro-2′,6′-dimethyl-N-(maleimidoethyl)acetanilide
14. 2-bromo-2′ethyl-6′-methyl-N-(maleimidoethyl)acetanilide
15. 2-iodo-2′,6′-diethyl-N-(maleimidomethyl)acetanilide
16. 2-bromo-2′,6′-diethyl-N-(maleimidomethyl)acetanilide
17. 2-chloro-2′,6′-diethyl-N-(citraconimidomethyl)acetanilide
18. 2-chloro-2′,6′-dimethyl-N-(citraconimidomethyl)acetanilide
19. 2-chloro-2′,6′-dimethyl-N-(citraconimidoethyl)acetanilide
20. 2-bromo-2′-ethyl-6′-methyl-N-(citraconimidoethyl)acetanilide
21. 2-iodo-2′,6′-diethyl-N-(itaconimidomethyl)acetanilide
22. 2-bromo-2′,6′-diethyl-N-(itaconimidomethyl)acetanilide
23. 1-(N-chloroacetyl-2′,6′-diethylanilinoethyl)-2-pyrrolidinone
24. 2-chloro-2′,6′-diethyl-N-[(2-piperidinon-1-yl)methyl]acetanilide
25. 2-chloro-2′,6′-diethyl-N-(2-piperidinon-1-ylethyl)acetanilide
26. 2-chloro-2′,6′-diethyl-N-(2-oxo-hexamethyleneiminomethyl)-acetanilide
27. 2-chloro-2′,6′-diethyl-N-(2-oxo-hexamethyleneiminoethyl)-acetanilide 28. 2-chloro-N-(acetamido-ethyl)-2',6'-diethyl acetanilide 29. 2-chloro-2',6'-diethyl-N-(N-methyl-dichlorobenzamidomethyl acetanilide 30. 2-chloro-2',6'-diethyl-N-(N-methyl-dichlorobenzamidoethyl acetanilide 31. 2-chloro-2',6'-diethyl-N-(N-ethylallylamido)methyl acetanilide 32. 2-chloro-2',6'-diethyl-N-(N-methyl-3-butenamidoethyl) acetanilide 33. 2-bromo-2',6'-dimethyl-N-(N-methylformamidomethyl acetanilide 34. 2-bromo-2',6'-dimethyl-N-(N-methylformamidoethyl acetanilide 35. 2-chloro-2',6'-diethyl-N-(N-methylacrylamidomethyl acetanilide 36. 2-chloro-2',6'-diethyl-N-(N-ethyl-3-ethoxy-propionamidomethyl acetanilide 37. 2-chloro-2',6'-diethyl-N-(N-methyl-beta-chloro-propionamidomethyl acetanilide 38. 2-chloro-2',6'-diethyl-N-(N-propyl-propionamidomethyl acetanilide 39. 2-chloro-2'-methyl-6'-ethyl-N-(Nethyl-acetamidoethyl acetanilide 40. 2-chloro-2',6'-diethyl-N-(N-methyl methacrylamidomethyl acetanilide 41. 2-chloro-N-(phthalimidomethyl)2',6'-acetoxylidide In order to illustrate the advantages of the present invention, the pre-emergence herbicidal ratings of representative 2-haloacetanilides were determined in greenhouse tests in which a specific number of seeds of a number of different plants, each representing a principal botanical type, were planted in greenhouse flats.

A good grade of top soil was placed in aluminum pans and compacted to a depth of three-eighths to one-half inch from the top of the pan. On the top of the soil was placed a predetermined number of seeds of various plant species. In the surface application the seeds were covered by overfilling the pan with soil and striking it level. The measured amount of chemical in a suitable solvent or as a wettable powder was applied to this surface. In the soil incorporation treatments the soil required to level fill pans after seeding was weighed into a pan, a known amount of the chemical applied in a solvent or as a wettable powder, the soil thoroughly mixed, and used as a cover layer for seeded pans. After treatment the pans were moved into a greenhouse bench where they were watered from below as needed to give adequate moisture for germination and growth.

Approximately 14 days after seeding and treating, the plants were observed and the results recorded. The herbicidal rating was obtained by means of a fixed scale based on the average percent germination of each seed lot. The ratings are defined as follows:

0 — No herbicidal activity
1 — Slight herbicidal activity
2 — Moderate herbicidal activity
3 — Severe herbicidal activity The pre-emergence herbicidal activity of the alpha-haloacetanilides are recorded in the following table for various application rates in both surface and soil-incorporated applications.

In the table, the letter "M" following the rate of application indicates that the herbicide was incorporated in the soil and the various seeds are represented by letters as follows:

A - Soybean
B - Sugar Beet
C - Wheat
D - Rice
E - Sorghum
F - Cocklebur (common)
G - Wild Buckwheat
H - Morningglory
I - Hemp sesbania
J - Lambsquarters
K - Velvetleaf
L - Bromus Tectorum
M - Panicum spp.
N - Barnyardgrass
O - Crabgrass

PRE-EMERGENCE HERBICIDAL ACTIVITY
PLANT SPECIES

| Compound of Example No. | Rate lb./A | A | B | C | D | E | F | G | H | I | J | K | L | M | N | O |
|---|---|---|---|---|---|---|---|---|---|---|---|---|---|---|---|---|
| 2 | 1 | 1 | — | 1 | 1 | 0 | 0 | 0 | 0 | 2 | 0 | 1 | 1 | 3 | 3 | |
|   | ¼ | 0 | 1 | 0 | 0 | 0 | 0 | 0 | 0 | 1 | 0 | 0 | 0 | 1 | 2 | 2 |
| 4 | 1M | 0 | 0 | 1 | 3 | 2 | 0 | 0 | 0 | 1 | 0 | 0 | 2 | 3 | 3 | 3 |
|   | ¼ | 0 | 0 | 1 | 0 | 0 | 0 | 0 | 0 | 2 | 1 | 0 | 0 | 3 | 3 | 3 |
|   | 0.05 | 0 | 0 | 0 | 0 | 0 | 0 | 0 | 0 | 1 | 0 | 0 | 0 | 3 | 3 | 2 |

The data set forth in the foregoing table clearly illustrates that the compounds of the present invention are effective herbicides and are particularly useful in the control of narrow leaf or grass weeds, even in the presence of crops including soybean, sugar beet, rice and sorghum.

The herbicidal compositions of this invention including concentrates which require dilution prior to application contain at least one active ingredient and an adjuvant in liquid or solid form. The compositions are prepared by admixing the active ingredient with an adjuvant including diluents, extenders, carriers and conditioning agents to provide compositions in the form of finely-divided particulate solids, granules, pellets, solutions, dispersions or emulsions. Thus the active ingredient can be used with an adjuvant such as a finely-divided solid, a liquid of organic origin, water, a wetting agent, a dispersing agent, an emulsifying agent or any suitable combination of these.

The compositions of this invention, particularly liquids and wettable powders, preferably contain as a conditioning agent one or more surface-active agents in amounts sufficient to render a given composition readily dispersible in water or in oil. The incorporation of a surface-active agent into the compositions greatly enhances their efficacy. By the term "surface-active agent" it is understood that wetting agents, dispersing agents, suspending agents and emulsifying agents are included therein. Anionic, cationic and non-ionic agents can be used with equal facility.

Preferred wetting agents are alkyl benzene and alkyl naphthalene sulfonates, sulfated fatty alcohols, amines or acid amides, long chain acid esters of sodium isethionate, esters of sodium sulfosuccinate, sulfated or sulfonated fatty acid esters petroleum sulfonates, sulfonated vegetable oils,s ditertiary acetylenic glycols, polyoxyethylene derivatives oils, alkylphenols (particularly isooctylphenol and nonylphenol) and polyoxyethylene derivatives of the mono-higher fatty acid esters of hexitol anhydrides (e.g., sorbitan). Preferred dispersants are methyl cellulose, polyvinyl alcohol, sodium lignin sulfonates, polymeric alkyl naphthalene sulfonates, sodium naphthalene sulfonate, and polymethylene bisnaphthalenesulfonate.

Wettable powders are water-dispersible compositions containing one or more active ingredients, an inert solid extender and one or more wetting and dispersing agents. The inert solid extenders are usually of mineral origin such as the natural clays, diatomaceous earth and synthetic minerals derived from silica and the like. Examples of such extenders include kaolinites, attapulgite clay and synthetic magnesium silicate. The wettable powders compositions of this invention usually contain from about 5 to about 95 parts of active ingredient, from about 0.25 to 25 parts of wetting agent, from about 0.25 to 25 parts of dispersant and from 4.5 to about 94.5 parts of inert solid extender, all parts being by weight of the total composition. Where required, from about 0.1 to 2.0 parts of the solid inert extender can be replaced by a corrosion inhibitor or antifoaming agent or both.

Aqueous suspensions can be prepared by mixing together and grinding an aqueous slurry of water-insoluble active ingredient in the presence of dispersing agents to obtain a concentrated slurry of very finely-divided particles. The resulting concentrated aqueous suspension is characterized by its extremely small particle size, so that when diluted and sprayed, coverage is very uniform.

Emulsifiable oils are usually solutions of active ingredient in water-immiscible or partially water-immiscible solvents together with a surface active agent. Suitable solvents for the active ingredient of this invention include hydrocarbons and water-immiscible ethers, esters or ketones. The emulsifiable oil compositions generally contain from about 5 to 95 parts active ingredient, about 1 to 50 parts surface active agent and about 4 to 94 parts solvent, all parts being by weight based on the total weight of emulsifiable oil.

Granules are physically stable particulate compositions comprising active ingredient adhering to or distributed through a basic matrix of an inert, finely-divided particulate extender. In order to aid leaching of the active ingredient from the particulate, a surface active agent such as those listed hereinbefore can be present in the composition. Natural clays, pyrophyllites, illite and vermiculite are examples of operable classes of particulate mineral extenders. The preferred extenders are the porous, absorptive, preformed particles such as preformed and screened particulate attapulgite or heat expanded, particulate vermiculite, and the finely-divided clays such as kaolin clays, hydrated attapulgite or bentonitic clays. These extenders are sprayed or blended with the active ingredient to form the herbicidal granules.

The granular compositions of this invention generally contain from about 5 parts to about 30 parts by weight of active ingredient per 100 parts by weight of clay and 0 to about 5 parts by weight of surface active agent per 100 parts by weight of particulate clay. The preferred granular compositions contain from about 10 parts to about 25 parts by weight of active ingredient per 100 parts by weight of clay.

The compositions of this invention can also contain other additaments, for example fertilizers, herbicides, other pesticides and the like used as adjuvants or in combination with any of the above-described adjuvants. Chemicals useful in combination with the active ingredients of this invention include for example triazines, ureas, carbamates, acetamides, acetanilides, uracils, acetic acids, phenols, thiolcarbamates, triazoles, benzoic acids, nitriles and the like such as:

3-amino-2,5-dichlorobenzoic acid
3-amino-1,2,4-triazole
2-methoxy-4-ethylamino-6-isopropylamino-s-triazine
2-chloro-4-ethylamino-6-isopropylamino-s-triazine
2-chloro-N,N-diallylacetamide
2-chloroallyl diethyldithiocarbamate
N'-(4-chlorophenoxy) phenyl-N,N-dimethylurea
1,1'-dimethyl-4,4'-bipyridinium dichloride
isopropyl N-(3-chlorophenyl)carbamate
2,2-dichloropropionic acid
S-2,3-dichloroallyl N,N-diisopropylthiolcarbamate
2-methoxy-3,6-dichlorobenzoic acid
2,6-dichlorobenzonitrile
N,N-dimethyl-2,2-diphenylacetamide
6,7-dihydrodipyrido(1,2-a:2',1'-c)-pyrazidiinium salt
3-(3,4-dichlorophenyl)-1,1-dimethylurea
4,6-dinitro-o-sec-butylphenol
2-methyl-4,6-dinitrophenol
ethyl N,N-dipropylthiolcarbamate
2,3,6-trichlorophenylacetic acid
5-bromo-3-isopropyl-6-methyluracil
3-(3,4-dichlorophenyl)-1-methoxy-1-methylurea
2-methyl-4-chlorophenoxyacetic acid
3-(p-chlorophenyl)-1,1-dimethylurea
1-butyl-3-(3,4-dichlorophenyl)-1-methylurea
N-1-naphthylphthalamic acid
1,1'-dimethyl-4,4'-bipyridinium salt
2-chloro-4,6-bis(isopropylamino)-s-triazine
2-chloro-4,6-bis(ethylamino)-s-triazine
2,4-dichlorophenyl-4-nitrophenyl ether
alpha, alpha, alpha-trifluoro-2,6-dinitro-N,N-dipropyl-p-toluidine
S-propyl dipropylthiolcarbamate
2,4-dichlorophenoxyacetic acid
N-isopropyl-2-chloroacetanilide
2',6'-diethyl-N-methoxymethyl-2-chloroacetanilide
monosodium acid methanearsonate
disodium methanecarsonate
N-(1,1-dimethylpropynyl)-3,5-dichlorobenzamide Fertilizers useful in combination with the active ingredients include for example ammonium nitrate, urea, potash, and superphosphate. Other useful additaments include materials in which plant organisms take root and grow such as compost, manure, humus, sand and the like.

When operating in accordance with the present invention, effective amounts of the acetanilides are applied to the plants, or to soil containing the plants, or are incorporated into aquatic media in any convenient fashion. The application of liquid and particulate solid compositions to plants or soil can be carried out by conventional methods, e.g., power dusters, boom and hand sprayers and spray dusters. The compositions can also be applied from airplanes as a dust or a spray because of their effectiveness at low dosages. The application of herbicidal compositions to aquatic plants is usually carried out by adding the compositions to the aquatic media in the area where control of the aquatic plants is desired.

The application of an effective amount of the compounds of this invention to the plant is essential and critical for the practice of the present invention. The exact amount of active ingredient to be employed is dependent upon various factors, including the plant species and stage of development thereof, the type and condition of soil, the amount of rainfall and the specific acetanilide employed. In non-selective pre-emergence treatments, the compounds of this invention are usually applied at an approximate rate of from 1 to 25 pounds per acre. In selective preemergence application to the plants or to the soil containing a dosage of from 0.05 to about 5 pounds of acetanilide per acre is usually employed. Lower or higher rates may be required in some instances. One skilled in the art can readily determine from this specification, including the examples, the optimum rate to be applied in any particularly case.

The term "soil" is employed in its broadest sense to be inclusive of all conventional "soils" as defined in Webster's New International Dictionary, Second Edition,, Unabridged (1961). Thus the term refers to any substance or media in which vegetation may take root and grow, and includes not only earth but also compost, manure, muck, humus, sand and the like, adapted to support plant growth.

Although the invention is described with respect to specific modifications, the details thereof are not to be construed as limitations except to the extent indicated in the following claims.

What is claimed is:

1. A herbicidal composition comprising an adjuvant and an effective amount of a compound of the formula

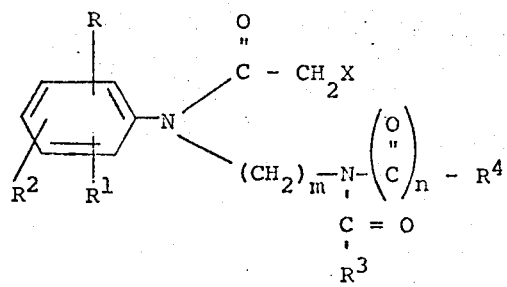

wherein:
R and $R^1$ are hydrogen, alkyl or alkoxy having at least 1 and not more than 10 carbon atoms and can be like or unlike,
$R^2$ is hydrogen, alkyl or alkoxy having at least 1 and not more than 10 carbon atoms, $NO_2$ or halogen and
$R^3$ and $R^4$ are combined to form an alkylene or alkenylene bridge having at least 2 and not more than 5 carbon atoms, or a phenylene group,
X is chlorine, bromine or iodine,
$m$ is an integer of 1 or 2, and $n$ is an integer of 0 to 2 inclusive.

2. A composition of claim 1 wherein R and $R^1$ are alkyl and are in the 2 and 6 position.

3. A composition of claim 2 wherein R and $R^1$ are ethyl.

4. A composition of claim 1 wherein $m$ is 1.

5. A composition of claim 4 wherein $n$ is 0.

6. A composition of claim 4 wherein $n$ is 1.

7. A composition of claim 5 wherein $R^3$ and $R^4$ are combined to form a phenyl group or a polymethylene bridge having at least 2 and not more than 5 carbon atoms.

8. A composition of claim 6 wherein $R^3$ and $R^4$ are combined to form a phenyl group or a polymethylene bridge having at least 2 and not more than 5 carbon atoms.

9. A composition of claim 1 wherein the compound is 2-chloro-N-(N-methylacetamido)methyl-2',6'-diethylacetanilide.

10. A composition of claim 1 wherein the compound is 2-chloro-2',6'-diethyl-N-(succinimidomethyl)acetanilide.

11. A composition of claim 1 wherein the compound is 1-(N-chloroacetyl-2',6'-diethylanilinomethyl-2-pyrrolidinone.

12. A herbicidal method which comprises applying an effective amount of a compound of the formula

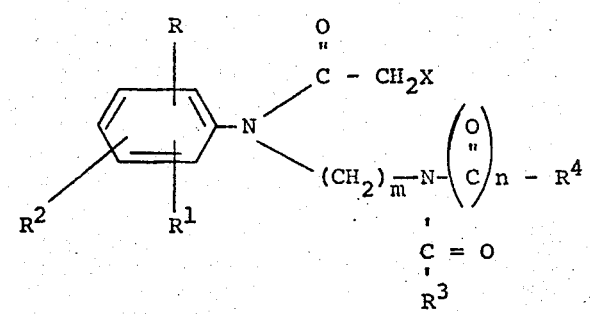

wherein:
R and $R^1$ are hydrogen, alkyl or alkoxy having at least 1 and not more than 10 carbon atoms and can be like or unlike,
$R^2$ is hydrogen, alkyl or alkoxy having at least 1 and not more than 10 carbon atoms, $NO_2$ or halogen and
$R^3$ and $R^4$ are combined to form an alkylene or alkenylene bridge having at least 2 and not more than 5 carbon atoms, or a phenylene group,
X is chlorine, bromine or iodine,
$m$ is an integer of 1 or 2, and $n$ is an integer of 0 to 2 inclusive.

13. A method of claim 12 wherein R and $R^1$ are alkyl and are in the 2 and 6 positions.

14. A method of claim 13 wherein R and $R^1$ are ethyl.

15. A method of claim 12 wherein $m$ is 1.

16. A method of claim 15 wherein $n$ is 0.

17. A method of claim 15 wherein $n$ is 1.

18. A method of claim 16 wherein $R^3$ and $R^4$ are combined to form a phenyl group or a polymethylene bridge having at least 2 and not more than 5 carbon atoms.

19. A method of claim 17 wherein $R^3$ and $R^4$ are combined to form a phenyl group or a polymethylene bridge having at least 2 and not more than 5 carbon atoms.

20. A method of claim 12 wherein the compound is 2-chloro-N-(N-methylacetamido)methyl-2',6'-diethylacetanilide.

21. A method of claim 12 wherein the compound is 2-chloro-2',6'-diethyl-N-(succinimidomethyl)acetanilide.

22. A method of claim 12 wherein the compound is 1-(N-chloroacetyl-2',6'-diethylanilinomethyl-2-pyrrolidinone.

* * * * *